Figure 4:
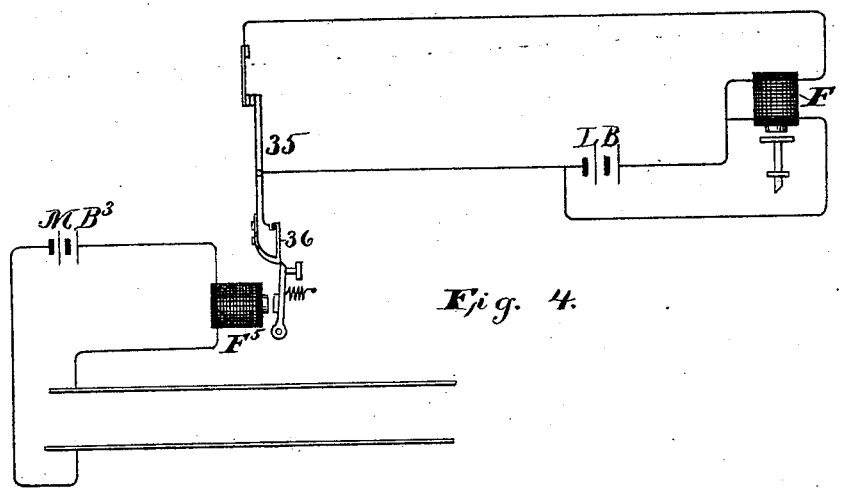

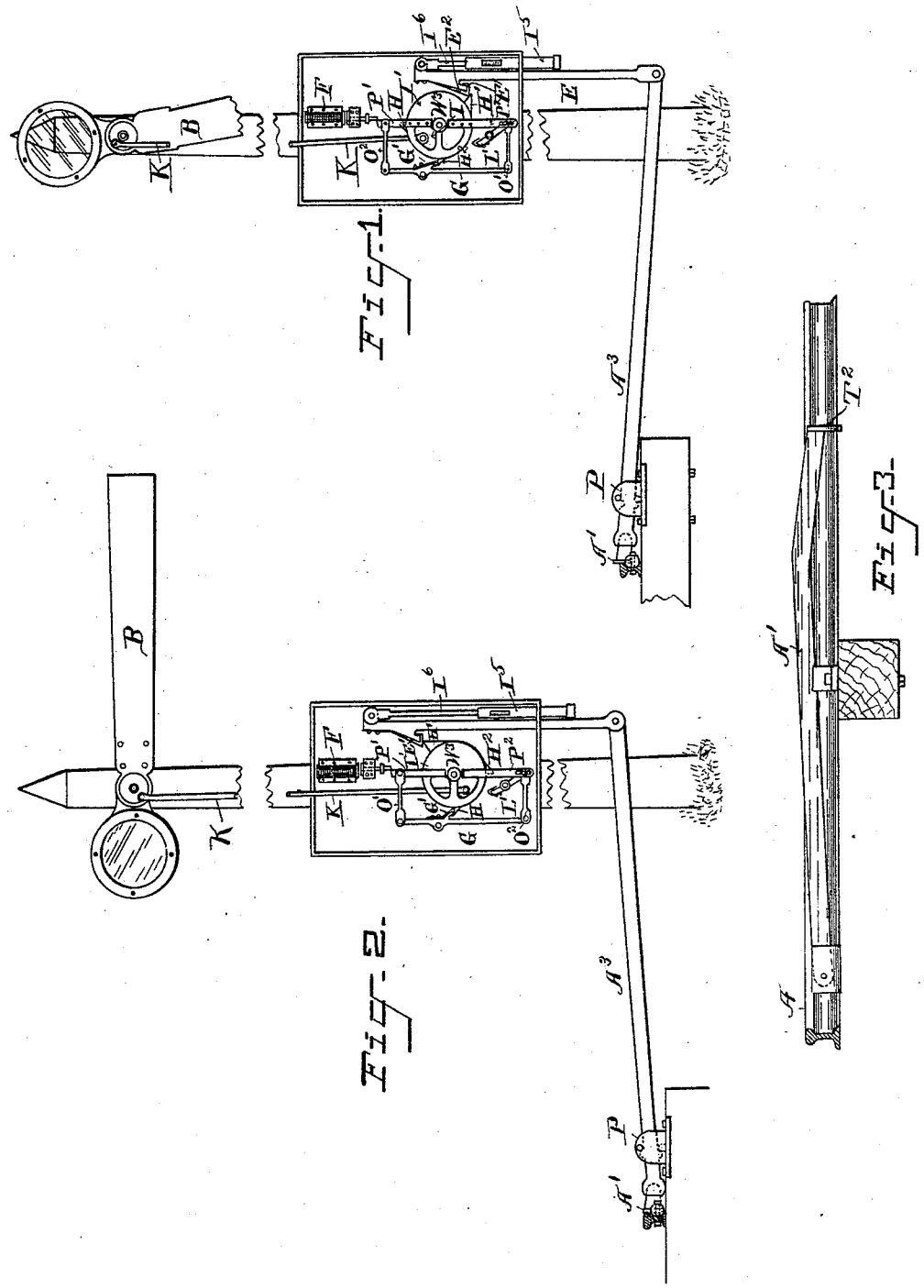

(No Model.) 2 Sheets—Sheet 2.

C. SELDEN.
RAILROAD SIGNAL.

No. 529,812. Patented Nov. 27, 1894.

ATTEST:
T. F. Conrey
M. T. Capel

INVENTOR:
Charles Selden

By H. C. Townsend
Attorney.

United States Patent Office.

CHARLES SELDEN, OF BALTIMORE, MARYLAND.

RAILROAD-SIGNAL.

SPECIFICATION forming part of Letters Patent No. 529,812, dated November 27, 1894.

Application filed January 4, 1894. Serial No. 495,649. (No model.)

*To all whom it may concern:*

Be it known that I, CHARLES SELDEN, a citizen of the United States, and a resident of Baltimore, in the State of Maryland, have invented a certain new and useful Railroad-Signal, of which the following is a specification.

My invention relates to an improvement in the manner of controlling the action of a magnet in a signaling or other system wherein a momentary action of said magnet is desired. In disclosing this invention, I will describe it in connection with the signal magnet used in the signaling system set forth in application, Serial No. 493,957, which was filed December 18, 1893. It is found for the most successful operation of the signal shown and described in said application that the signal magnet should have but a momentary action, by which I mean a change of magnetic condition from the normal immediately succeeded by a restoration to the normal condition. Thus, for instance, assuming that the magnet is normally charged the momentary action required would be a discharge promptly followed by a charge, or if the magnet be a polarized magnet the change would be from one polarity to another immediately followed by restoration to the normal polarity. With the ordinary construction of circuit controller for the circuit of said magnet, it is obvious that such double change of condition will be produced only by a double change of position in the circuit controller, that is to say, it will be necessary to move the circuit controller first in one direction and then in the other in order to produce the double change of condition in the magnet. If the circuit controller be a device which simply closes circuit when moved in one direction and opens circuit when moved in the other direction, it is obvious that the time involved in the operation of the signal magnet will depend upon the interval between the two movements of the circuit controller. If this interval be too much prolonged then the signal magnet will not be properly controlled in its action.

The object of the present invention is to secure a momentary action of the signal magnet that shall be independent in its action of the lapse of time involved in the double change of electric condition produced by the circuit controller or in the double change of condition thereof from normal position to the opposite position and back again.

This invention briefly speaking may be said to consist in so combining the circuit controller and its actuating device that a double change of position of said circuit controller shall be produced through a single change of position of its actuating device. In the case of a relay controlling the circuit of the signal magnet the relay armature would, in moving from one position to the other, produce a double change of circuit condition in the circuit of the signal magnet. By preference I organize the parts so that this double change shall be produced upon movement in one direction only of the relay armature. The relay itself may, under these conditions, be controlled by any kind of circuit closing device which shall upon movement in one direction close the circuit of the relay and upon movement in the other direction open it or by any form of circuit controller that shall change the electrical condition of the relay as it moves backward and forward. As a single change of condition in the relay will however, produce the double change of condition required in the signal magnet, it is quite obvious that the action of the latter will be entirely independent of the lapse of time which occurs in the production of a complete double change of condition in the relay itself.

The general nature of this invention will be hereinafter fully set forth.

In the accompanying drawings:—Figure 1, is a side elevation of a signal apparatus with the magnet of which my invention is useful or to which my invention may be applied. Fig. 2, shows the same in the danger position which it takes under the action of a track lever. Fig. 3, is a side elevation of the track lever. Figs. 4, 5, 6 and 7, illustrate several different arrangements of my improved apparatus for producing the desired momentary action of a signal magnet. Figs. 1, 2 and 3, will first be briefly described as they represent that portion of the invention presented in the above mentioned application to which the present invention is applied.

B, is the main semaphore arm or blade of a block signal pivoted, as shown, on a suitable support and provided with the usual lens and lantern for night use.

K, is the connection rod by which arm B, is depressed to safety. The signal is so biased, as well understood in the art, that on breakage or failure of the connection rod or other portion of the mechanism by which it is held in safety position, it will, by its own bias, swing to danger position.

I, is a pivoted disk or wheel with which the connection rod K, is joined by a crank pin or similar device whereby the signal arm or blade and the disk may be caused to move together.

G', is a catch mounted on a lever G, and serving by its engagement with a lug, tooth or similar device H, on disk I, to hold the disk and connected signal in danger position against the action of the overbalancing weight that acts upon the disk through the lug or projection H', thereon, as will be presently described. When the catch releases the disk the weight operating downward upon the lug H', turns the semaphore to safety.

$H^2$, is another lug or projection on the disk that engages with the catch when the parts have moved to normal safety position under the action of the overbalancing weight. The breakage of the catch or other parts holding the disk and semaphore in such position allows a sufficient further movement of the parts under the influence of the overbalancing weight, to cause the automatic disengagement or disconnection of the latter from the disk, whereupon the biasing force tending to set the signal to danger will assert itself and so set it.

E, is a rod which is supported on a disk I, by means of a lug or hook E', on the rod resting upon the lug H', of the disk. The rod E, or parts connected with it constitute the overbalancing weight that tends to set the signal and hold it in safety position. The removal of such weight either by the lifting of the rod E, or by the slipping of the hook E', past the lug H', frees the signal from such weight and the bias of the signal sets it to danger automatically. As will be seen the rod E, may be lifted freely away from engagement with the disk.

Figure 5:
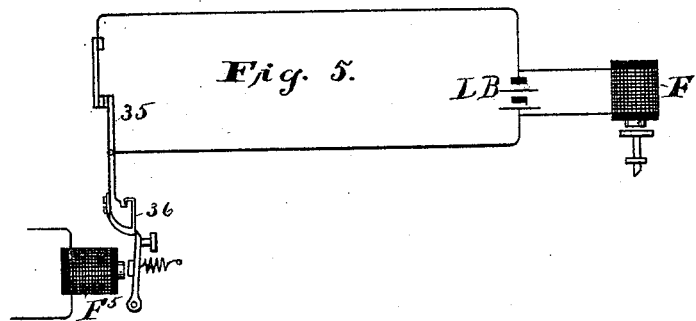

$E^2$, is a spring applied to the hook E', as shown, to allow it to freely pass the projection H', when the rod is moved in an upward direction after having slipped down past the projection. The position of the parts while the signal is in safety position is shown in Fig. 1, and the position when the rod E, has been lifted so as to allow the signal to take the danger position is shown in Figs. 2 and 5.

A', is any track lever for lifting the rod E, to permit the signal to take the danger position. The track lever is properly constructed to gradually take the blow or impact of a car wheel and is connected with the rod through a lever $A^3$, fulcrumed from the lever stand P. The track lever A', and the lever $A^3$, are connected through a knuckle joint or other device, as shown in the drawings. The weight of the track lever A', partly counterbalances that of the rod E, and connected parts so that if the track lever be broken, a greater weight comes upon the rod E, or if the lever $A^3$ should break between the track lever and the stand the weight of rod E, will pull down with greater force. If the lever $A^3$, should break between the rod E, and the fulcrum the weight would be freed from the counterbalancing effect of the track lever and connected parts. The effect of this is to cause a greater strain upon the disk I, at the point of connection of rod E, therewith, and thus cause the hook E', to slip off the lug H', whereupon the bias of the signal will set the latter to danger. This automatic disconnection of the overbalancing weight from the signal will obviously take place when the parts are in the position shown in Fig. 1, which is supposed to be the safety position. The rod E, should be allowed a slight lateral movement in its guides for the purpose of allowing this automatic disconnection. When the rail A', is depressed by the action of the car wheel the rod E, is raised to the position shown in Fig. 2, and the signal sets itself automatically to danger in which position the parts are locked by the action of the catch G'. A keeper indicated at $T^2$, is applied by preference to the rail or track lever A', to act as a stop to keep the track lever from flying clear above the rail A. This stop is so adjusted, however, as not to interfere with the free play of the track lever so that if it goes up above normal or adjusted position, the signal will go to danger as before described by the overbalancing weight automatically disconnecting itself from the signal mechanism. In connection with the rod E, it is desirable to employ a dash-pot $I^5$, the piston rod of which indicated at $I^6$, is connected with rod E, in any proper manner. The catch G', is freed to allow the weight E, to settle and set the signal to safety, through the action of an electro-magnet or other mechanism, as will be presently described. The lug G', is likewise provided with a spring $G^3$, in engagement therewith, as shown, to assist in the passage of the lugs on the disk I, past the catch in a reverse direction. The parts as thus far described for operating upon the semaphore to cause it to move to danger or back to safety afford a highly efficient means for operating said signal by the mechanical action of the train. The dash-pot is suitably constructed to allow the bar E, to rise freely but to descend with a retarded movement, thus delaying the movement of the lug $H^2$, around to position to engage with the catch G'.

The supplemental power to operate upon the catch G', is furnished by a disk I', mounted concentrically with the disk I, and weighted at its part $W^3$. From the disk I', project the two arms P', $P^2$, the upper one of which is normally locked by the projection extending downwardly from the armature of the magnet F. The arms P', $P^2$, are connected by links O', O², with the lever G, carrying the catch G'. The weight of the disk I', tends obviously to move the arms and to swing the lever C, in a direction to disengage the catch G', from the lug H, of the wheel I. This movement takes place when the armature of the magnet F, rises to release the upper arm P'. The parts are restored to normal position or position shown in Fig. 1, by the action of a lever L', which is connected at one end with the arm P², and at the other end has a toe or projection I², adapted to be engaged by a lug H², on the disk I, when the latter is released and turned by the downward movement of the rod E.

The action of the parts is as follows: Assuming that they are in the position shown in Fig. 1, when the armature of the magnet F, is raised the weight of the disk I', turns the arms P', P², and operates the catch G', thus releasing disk I. At the same time the lever L', is turned so as to move the end I², into the path of the lug or projection H², on the disk I. The disk I, being released turns under the action of the overbalancing weight E, and the projection H², upon said disk, by engaging with the end I², of lever L, swings the disk I', back to the position indicated in the drawings. This action results in the storage of power in the disk I', for acting upon the lug G', when the magnet F, again acts. The end of the lever L', is furnished with a spring as shown that will permit the lug H², to readily pass it in a reverse direction as it may be required to do, if the rod E, should slip away from disk I, while the parts are in the position shown in Fig. 1, at which time as before explained, the disk I', rotates under the influence of the bias in the semaphore.

For the purpose of more clearly setting forth my present invention, I have chosen to describe it as applied to the above specified signal mechanism though it may be applied to any form of signal mechanism wherein a momentary action of the signal magnet is desired.

The failure to obtain the momentary action of the magnet in the above described signal mechanism would result as follows: As the circuit is closed to magnet F, the armature thereof is attracted for the return of the signal to safety position. Said armature should fall back immediately so as to rest in the path of arm P', and insure the stoppage of the disk I, by the engagement of catch G', upon projection H². Should the armature fail to return immediately arm P', would have passed over too far and projection H², would have passed by catch G', allowing rod E, to lose its hold upon disk I, and allowing the signal to immediately return to danger whereas it should have remained at safety. My present invention insures this desired momentary action of the magnet no matter how slowly the train may move nor how long the primary circuit may be closed by the train as but the movement of the relay armature in one direction is required to cause the successive making and breaking of the circuit of the signal magnet.

In this invention I prefer to wind the signal magnet F, differentially though it may be otherwise wound as set forth below.

In Fig. 4, F, is a signal magnet and F⁵, is the relay here represented on a normally open circuit. MB³, is the battery for the relay magnet the circuit of said battery being completed by a section of rails when the cars pass over them or by other means. Magnet F, is differentially wound being provided with two coils one in the continually closed circuit of the local battery the other in a circuit governed by the circuit controlling lever 35, which is in this instance normally in position to close the second circuit of the differential magnet. The circuit controlling lever 35, is engaged by the armature lever of the relay or by other actuating device, and is so constructed and arranged with relation to said actuating device that when the latter moves from one position to the other it will first move the lever 35, in a direction to open the circuit and then by slipping past the end of the lever 35, immediately allow it to resume its normal position and again close the circuit. The lever 35, forms in effect in the arrangement shown, a supplemental armature lever for the relay F⁵. The lower part of the circuit controlling lever is fitted with a spring 36, as indicated, similar to the spring on the catches already described so as to permit the relay armature lever or other actuating device in resuming position, to pass the end of the lever freely.

The operation of the device is as follows: Normally both circuits of the differential magnet F, are closed and its armature retracted. The armature of the relay F⁵, is also in retracted position the circuit of the relay being open. As soon as the circuit of said relay is closed by any device used for the purpose, whether a section of the line of rails or other circuit closing appliance employed with railroad signal apparatus, its armature is drawn up. In moving up it will carry the circuit controlling lever 35, with it a certain distance, thereby opening one of the differential circuits of magnet F, and at this instant the signal magnet will become energized by its other coil and release the signal, but the magnet will be immediately changed again because after the armature lever of the relay or other actuating device has moved the circuit controller lever 35, a certain distance, it will pass by it and the spring or other actuator of said circuit controller will restore it to normal position thus closing the second differential circuit of relay F, and causing the armature of the said signal magnet to immediately drop back again. It will be therefore seen that by one movement of the armature lever for the relay or of any other actuating device applied to the circuit controller, or in other words by the one change of position thereof, a double change of position of the circuit controller and a double change in electrical condition of the magnet F, is produced. Hence it is immaterial how long an interval may ensue before the second change in electrical condition of the relay $F^5$, takes place which shall restore it to normal condition. When such change does take place however its armature will fall back by reason of its retracting spring but by reason of its form at the top and through the yielding of the spring on the end of the controller 35, will resume its normal position without producing any movement of the controller 35. In other words the movement of the relay armature in one direction will cause a break and make of the local circuit but its movement in the opposite direction or in resuming normal action will cause no change in the condition of the magnet F.

It will be obvious to mechanicians that many other devices for producing such a double change of position of the circuit controller by a single change in position of its actuating device may be used for the same purpose, and I do not, therefore, wish to be understood as limiting myself to the special devices described in my invention consisting in the combinations of apparatus having the actions set forth.

Instead of using a differentially wound magnet I may employ the arrangement shown in Fig. 5, in which the local battery is normally short circuited from the magnet by the circuit controller. When the circuit through the controller 35, is open, the magnet becomes excited and when it is closed the magnet loses its power and its armature drops back to normal position. The action in other respects is the same as in Fig. 4.

It is quite obvious that the differentially wound magnet might be operated with its armature normally attracted this requiring simply that the circuit governed by the controller 35, should be normally open and should be first closed and then broken by the single change in electrical condition of the relay. In this operation the armature of magnet F, would be retracted for an instant only and would immediately resume normal position in its operation being quite independent of any further lapse of time in the restoration of the actuating device for the controller 35, to normal position. This arrangement of the contacts I have indicated in Fig. 7.

Figure 6:
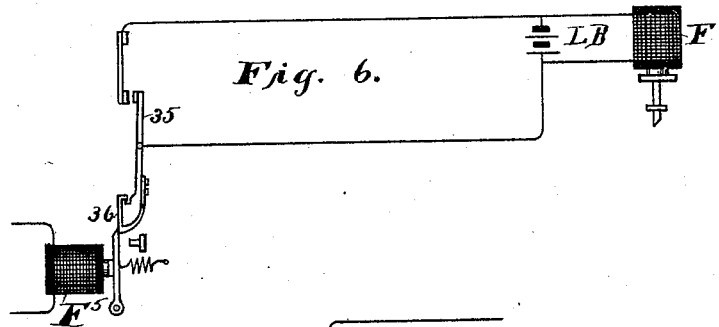
Figure 7:
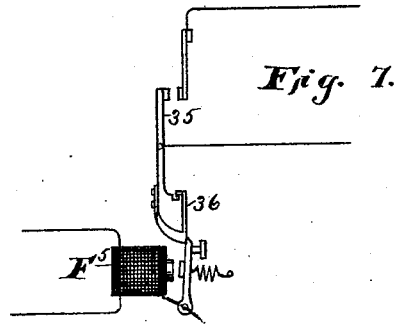

Fig. 6, indicates how the arrangement Fig. 5, may be modified to allow the magnet F, to be normally charged. It also shows that the relay $F^5$, might be also normally charged. In this case it will be understood that the device governing the circuit of magnet $F^5$, would keep said circuit normally closed and the action of the signal magnet will follow a break of such circuit. The armature of the relay in dropping back would cause the circuit controller to first short circuit the current of the battery L, B, from the magnet F, and immediately again allow current to flow in said magnet by breaking the short circuit. From this arrangement it is quite obvious that if the battery should fail at any time the signal will be released.

I have shown my invention as carried out by the use of a circuit controller with makes and breaks of circuit by the use of a relay the condition of which is changed by a make or break of its circuit, but it will be understood that my invention is not limited to changing the electrical condition of magnets by makes and breaks but extends also to a change of condition produced in any other way as by reversals of polarity in the exciting current.

It will be obvious that instead of employing a differentially wound magnet, as shown in Fig. 4, or an ordinary magnet, the battery controlling which is at times in a shunt, as in Fig. 5, that an ordinary magnet and a battery connected in the usual electric circuit and governed by controller 35 may be used.

What I claim as my invention is—

1. In a railroad signal apparatus, the combination with the signal releasing magnet, of a signal which is set into positions of safety and danger by successive operations of the magnet, a relay magnet, circuit controlling devices therefor governed by a passing train, and means for producing a double change of circuit condition in the signal magnet by a single change in the electrical condition of the relay magnet.

2. In a railroad signal apparatus, the combination substantially as described, of a signal magnet requiring momentary action, a relay, a circuit closer and breaker in the circuit thereof, a circuit controller for the signal magnet, and means for producing a double change of position in said controller on movement of the relay armature in one direction only.

Signed at Baltimore city, in the State of Maryland, this 30th day of December, A. D. 1893.

CHARLES SELDEN.

Witnesses:
GEO. W. HAULENBEEK,
E. J. SILKMAN.